United States Patent [19]

Ogiso

[11] Patent Number: 5,180,042

[45] Date of Patent: Jan. 19, 1993

[54] TORQUE TRANSMISSION CONTROL DEVICE

[75] Inventor: Kenji Ogiso, Nagoya, Japan

[73] Assignee: Mighty Engineering Inc., Japan

[21] Appl. No.: 748,033

[22] Filed: Aug. 21, 1991

[30] Foreign Application Priority Data

Mar. 26, 1991 [JP] Japan ............... 3-18584[U]

[51] Int. Cl.⁵ .......................................... F16D 43/20
[52] U.S. Cl. ..................... 192/56 R; 192/70.12; 192/70.26; 464/46
[58] Field of Search ............ 192/56 R, 70.11, 70.12, 192/70.19, 70.2, 70.26; 464/30, 41, 46

[56] References Cited

U.S. PATENT DOCUMENTS

| | | | |
|---|---|---|---|
| 1,164,531 | 12/1915 | Kwis | 192/112 X |
| 1,739,947 | 12/1929 | Chilton | 464/46 X |
| 2,659,220 | 11/1953 | Cherry | 464/46 |
| 2,708,836 | 5/1955 | Stuart | 464/46 X |
| 2,779,175 | 1/1957 | Hew | 464/46 |
| 2,812,046 | 11/1957 | Taylor | 192/111 B |
| 3,092,983 | 6/1963 | Huber | 464/46 |
| 3,315,773 | 4/1967 | Aschauer | 464/46 X |
| 3,319,751 | 5/1967 | Salchini | 464/46 X |
| 3,722,645 | 3/1973 | Sommer | 192/70.2 X |
| 4,338,798 | 7/1982 | Gilhan | 464/41 X |
| 4,624,650 | 11/1986 | Hiruma et al. | 464/46 X |
| 5,038,904 | 8/1991 | Miller | 192/70.2 |
| 5,086,898 | 2/1991 | Patton et al. | 192/70.12 |

FOREIGN PATENT DOCUMENTS 0881414 11/1981 U.S.S.R. ..................... 464/64

Primary Examiner—Leslie A. Braun
Assistant Examiner—Andrea Pitts
Attorney, Agent, or Firm—Davis, Bujold & Streck

[57] ABSTRACT

A torque transmission control device, coupling belleville springs which sandwich friction discs interposed between plural input discs and output discs in a housing. These members are pressed together by a friction adjustment screw set in a desired position to prevent a drive torque, exceeding a predetermined value, from being transmitted from an input to an output. A cap is provided with a rotation limiting opening to fit a protrusion on the friction adjustment screw and with stopper recesses for engaging protrusions formed on the housing to prevent the friction adjustment screw from rotating relative to the housing. This ensures that the predetermined torque value adjusted by the friction adjustment screw does not change during use.

13 Claims, 4 Drawing Sheets

TORQUE TRANSMISSION CONTROL DEVICE

BACKGROUND OF THE INVENTION

The present invention relates to a torque transmission control device for connection at one end to a power source such as an impact wrench that generates an impact load in a rotational direction and at its other end to a bolt head, via an output shaft. The present invention relates more particularly to a torque transmission control device that limits transmitted torque to a predetermined value using a friction clutch mechanism.

A known torque transmission control device with a friction clutch comprises a hollow cylindrical housing with an opening at one end, an output shaft inserted in the housing along the axis of the housing, at least one ring spring provided at the bottom of the housing, at least one ring member engaged with the housing but not with the output shaft, at least one ring member engaged with the output shaft but not with the housing, dry friction rings interposed between the ring members, at least another ring spring provided adjacent the opening with a friction adjustment screw, on top thereof, screwed in the opening by means of a thread from the opening toward the bottom of the housing. The output shaft penetrates the ring springs, the ring members, and the dry friction rings through their central holes. The friction adjustment screw adjusts the friction produced between the ring members, thereby limiting a torque transmitted from a motor connected with the housing to the output shaft to a predetermined value.

A general purpose motor, if connected to the housing, does not inadvertently change a predetermined maximum torque setting because it does not generate an impact load. However, if an impact wrench is connected to the housing, a rotational impact load is transmitted to the friction adjustment screw as a rotational vibration to change the setting of the friction adjustment screw. This causes the predetermined maximum transmitted torque to change during bolt tightening.

An object of the present invention is to overcome the above identified problem to provide a torque transmission control device that prevents rotational vibration from changing the setting of the friction adjustment screw so that a predetermined maximum transmitted torque does not change during bolt tightening operations.

SUMMARY OF THE INVENTION

A torque transmission control device according to the present invention made to achieve the above object comprises a housing having at one end a cylindrical cavity with an opening and at the other end a connection for a power source that generates a rotational impact load, an output shaft being present in the cavity of the housing, at least one first flat member with a contact face that is rotatable with the output shaft, at least one second flat member with a contact face that is rotatable along with the housing, the first and the second flat members both being provided to bring the output shaft and the housing into contact with each other in the axial direction, a friction member interposed between the first and the second flat members, resilient pressure members provided in the cavity for generating pressure to the first and the second flat members in such directions that the first and the second flat members are pushed toward each other, and a pressure adjuster having a through hole in the center thereof through which the output shaft penetrates and screwed in the housing from the opening side for adjusting the pressure of the elastic pressure members corresponding to a screw-in position thereof, the torque transmission control device further comprises a projection extending in the direction opposite to the housing and provided around the through hole of the pressure adjuster, the shape of the projection being any shape including a prism and an elliptic cylinder other than a body of rotation formed by rotating a given plane about the axis of the housing and a stopper cap being fixed on the opening of the housing and having a stopper hole for stopping the projection from moving.

In accordance with the torque transmission control device of the present invention, the projection provided around the through hole of the pressure adjuster has a shape other than a body of rotation formed by rotating a given plane about the axis of the housing and the stopper cap having a stopper hole is fixed on the housing to stop movement of the projection. Therefore, the pressure adjuster cannot move with respect to the housing and change the screw-in position; that is, when a rotational impact load is applied to the housing, the relative position of the pressure adjuster to the housing does not change so that a predetermined maximum transmitted torque value set as an upper limit does not change during bolt tightening operations. Furthermore, the screw-in position of the pressure adjuster can be changed after removing the stopper cap from the housing.

A projection having a shape of a body of rotation formed by rotating a plane about the axis of the housing such as a cylinder or a ring cannot achieve the desired object of the invention and does not suffice for the projection of the invention because a stopper hole cannot prevents movement of a projection in such a shape. However, a projection having a shape of a body of rotation may be used as long as the body of rotation does not have the same axis as that of the housing. Such a projection, which can be stopped from moving with respect to the housing, will suffice for the present invention.

A set screw, which is generally used to stop a screw from rotating, will not suffice to fix the pressure adjuster because rotational vibration may loosen it up. A lock pin penetrating the housing will be disadvantageous because the pressure adjuster will have only one screw-in position to exert a fixed pressure.

Since the present invention adopts the stopper cap constructed as described above, the pressure adjuster does not move from a given screw-in position to exert a desired pressure.

BRIEF EXPLANATION OF THE ATTACHED DRAWINGS

EMBODIMENT

Figure 1:
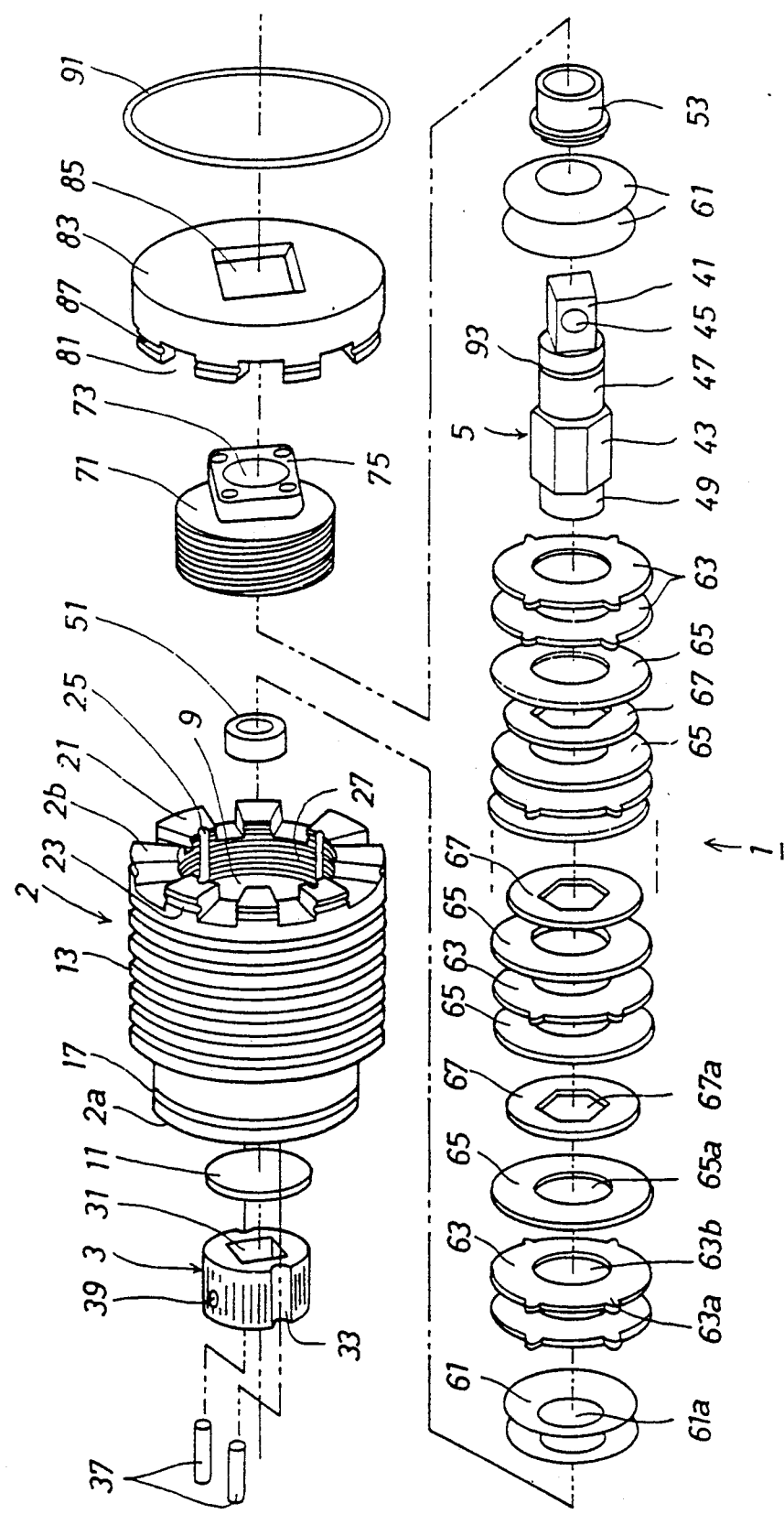
FIG. 1 is a perspective exploded view of the torque transmission control device embodying the present invention.

The embodiment of the present invention will now be explained with specific reference to the attached drawings.

A torque transmission control device 1 of the present embodiment receives a rotational impact load applied by an impact wrench (not shown) at a tool steel input bush 3 fixed in a cylindrical housing 2 made of aluminum alloy. The housing 2 transmits the received rotational impact to an output shaft 5 engaged with the housing 2 via a friction clutch mechanism capable of transmitting a rotational torque not exceeding a predetermined value.

The housing 2 has an input bush insert bore 7 to accommodate the input bush 3 at one end and an output shaft insert bore 9 bored to accommodate the output shaft 5 at its other end. The input bush insert bore 7 and the output shaft insert bore 9 are coaxial and separated from each other by a liquid tight partition seal 11 inserted therebetween. The housing 2 is also provided with plural ribs 13 for heat radiation from the periphery and with plural heat radiation holes 15 in the (lower) end face 2a in which the input bush insert bore 7 is provided. Moreover, an O-ring groove 17 is provided around the periphery of the housing 2 near the lower end face 2a. A radial bore 19 extends from the bottom of the O-ring groove 17 through the axis of the housing 2.

The other (upper) end surface 2b of the housing 2 in which the output shaft insert bore 9 is provided is divided into sixteen equal portions. Eight stopper protrusions 21 protrude axially from every second portion to be spaced equally round the circumference of the upper end surface 2b. In other words, the stopper protrusions 21 protrude from eight portions alternating with the remaining eight portions. Therefore, the circumferential length of each stopper protrusion 21 is equal to that of each non-protrusion portion. The stopper protrusions 21 are provided with an intermittent O-ring groove 23, which is similar to the O-ring groove 17 except that the partial ring groove 23 is only formed in the stopper protrusions 21. Every second stopper protrusion 21, namely four of them, has, on its inner surface, an axial groove 25 of semicircular cross-section, extending to the inner end of the output shaft insert bore 9. A thread 27 is formed on the inner surface of the output shaft insert bore 9 and the inner surface of the protrusions 21.

Figure 4:
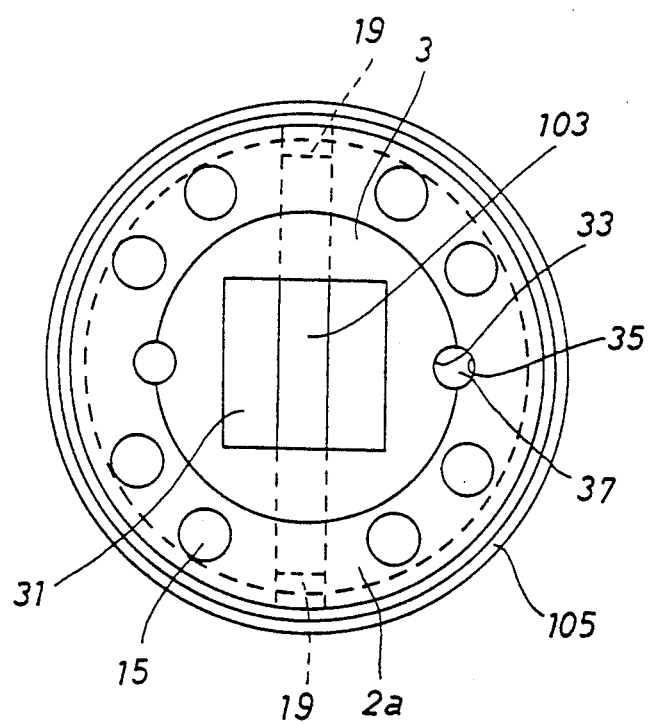
FIG. 4 is an end view of the torque transmission control device of the embodiment as seen from the input bush side.

The input bush 3 is provided with a square opening 31 in the center, a knurled periphery, and two axial grooves 33 of semi-circular cross-section on the periphery. As shown in FIG. 4, the semicircular grooves 33 in combination with semicircular grooves 35 cut in the input bush insert bore 7 of the housing 2 form bores in which lock pins 37 are inserted to firmly fix, against relative rotation, the input bush 3 to the housing 2.

The input bush 3 is provided with a transverse bore 39 that passes through the center of the square opening 31. The transverse bore 39 is placed in line with the radial bore 19 when a bit 100 of an impact wrench is inserted into the square opening 31 to fix the bit 100 and the input bush 3 to the housing 2. The cross-section of the bit 100 is a square to fit in the square opening 31. In other words, the input bush 3 is fitted in the input bush insert bore 7 after the liquid tight partition seal 11 such that the transverse bore 39 of the input bush 3 and the radial bore 19 of the housing 2 are placed in the same line and the two lock pins 37 are inserted therein to prevent rotation.

Figure 2:
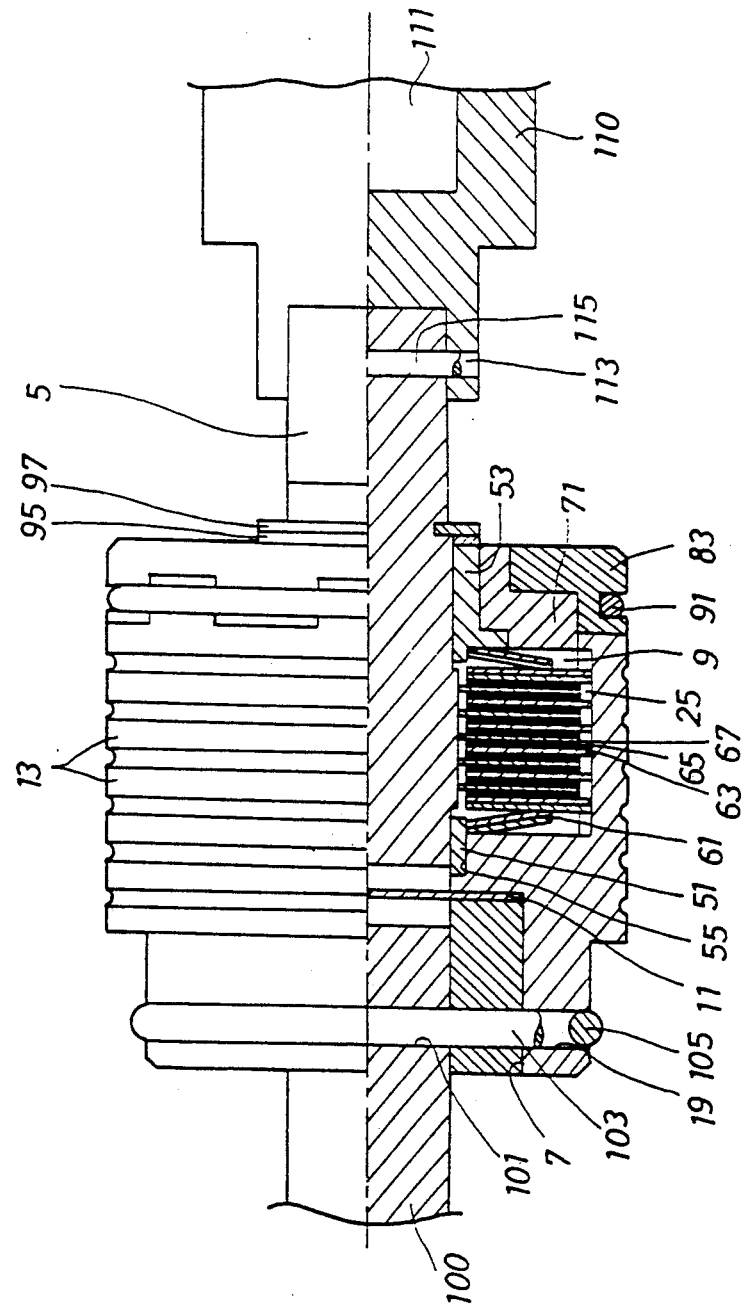
FIG. 2 is a part sectioned side elevation of the torque transmission control device of the embodiment.
Figure 3:
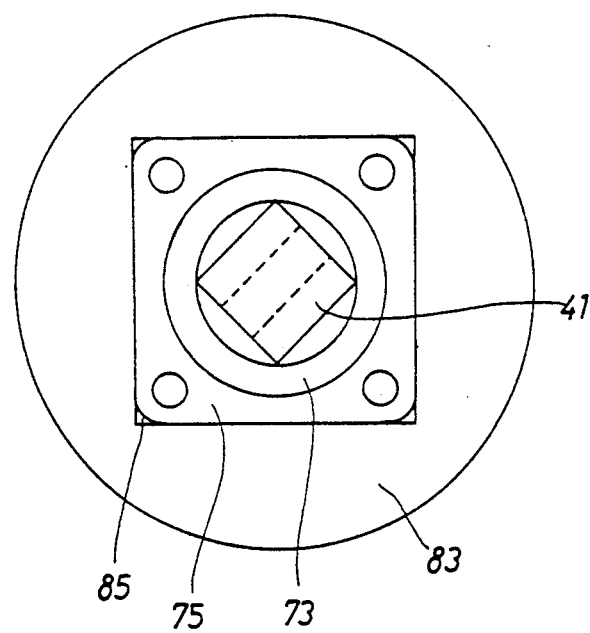
FIG. 3 is an end view of the torque transmission control device of the embodiment as seen from the output shaft side.

As shown in FIGS. 1 and 2, the output shaft 5 is provided with a square drive 41 at one end and a hexagonal portion 43 near its other end. The square drive 41 is provided with a through hole 45 passing through the axis of the output shaft 5. The square drive 41 is for attachment of a socket 110 for connection to a bolt head. The output shaft 5 also has a cylindrical portion 47 between the square drive 41 and the hexagonal portion 43 and a cylindrical portion 49 remote from the square drive 41. Cylindrical bearings 51 and 53, both made of a copper alloy, are fitted on the cylindrical portions 47 and 49, respectively, in assembly. The cylindrical bearing 53 has a flange on the periphery.

To accommodate the output shaft 5 into the housing 2, the cylindrical bearing 51 is fitted in a recess 55 provided in the bottom of the output shaft insert bore 9. The cylindrical portion 49 of the output shaft 5 is inserted into the cylindrical bearing 51. Two belleville springs 61 having central hole 61a, are superimposed on each other and positioned in the output shaft insert bore 9 such that the output shaft 5 penetrates the central hole 61a.

Two input discs 63 each having central holes and four protrusions 63a on the periphery are piled up and are inserted in the housing 2 on the belleville springs 61 so that the output shaft 5 penetrates the central holes of the two input discs 63. The four protrusions 63a of each of the input discs 63 engage the four semicircle grooves 25.

A friction disc 65 having a central hole 65a is fitted on the output shaft 5 in the output shaft insert bore 9. The central holes 65a, 61a, and 63a of the friction disc 65, the belleville springs 61, and the input discs 63, respectively, are made in such a size that they do not engage with the output shaft 5.

An output disc 67 having a hexagonal central opening 67a is placed over the friction disc 65 such that the hexagonal portion 43 penetrates the hexagonal central opening 67a. The outer diameter of the output disc 67 is made smaller than the inner diameter of the output shaft insert bore 9.

Two sets of a friction disc 65, an input disc 63, a friction disc 65, and an output disc 67 are installed one set after another on the output shaft 5 in the same manner described above as shown in FIG. 1. After installing two input discs 63 and two belleville springs 61 on top of the two sets, the cylindrical bearing 53 having a flange is fitted on the cylindrical portion 47 of the output shaft 5 and, at the same time, in the output shaft insert bore 9.

Upon installing the above members in the output shaft insert bore 9 as explained above, a pressure adjustment screw 71 is screwed in the thread 27 provided in the output shaft insert bore 9 to give the belleville springs 61 resilient deformation to bias the input discs 63 and output discs 67 toward one another.

The friction adjustment screw 71 is provided with a central bore 73 to accommodate the output shaft 5 and is also provided on its outer surface with a square protrusion 75 also having a central bore.

When a desired friction is obtained by the friction adjustment screw 71, a cap 83 having eight circumferentially evenly spaced recesses 81 is mounted on the housing 2 by engaging the eight stopper protrusions 21 with the stopper recesses 81. In this way, the cap 83 does not rotate relative to the housing 9.

A stopper square central opening 85 is provided in the center of the cap 83 to engage the square protrusion 75 of the friction adjustment screw 71 to prevent rotation thereof. The cap 83 is, therefore, engaged with both the housing 2 and the friction adjustment screw 71 thereby to prevent change of the relative position of the friction adjustment screw 71 to the housing 2.

A partial ring groove 87 is machined in the cap 83, to form a complete ring groove with the partial ring groove 23 machined in the periphery of the stopper protrusions 21, when the cap 83 and the housing 2 are fitted with each other.

A synthetic rubber O-ring 91 is fitted in the ring groove formed by the ring grooves 23 and 87 to fix the cap 83 to the housing 2 more securely. Further, a washer 95 and a snap ring 97 are fitted in a ring groove 93 machined in the output shaft 5 to complete the assembly of the torque transmission control device.

The bit 100 of an impact wrench is inserted into the square opening 31 of the input bush 3 such that a connection hole 101 of the bit 100 is in line with the through holes 19 and 39 to permit a stopper pin 103 to be inserted therethrough. Then, an O-ring 105 is fitted in the O-ring groove 17 of the housing 2 to keep the stopper pin 103 in place.

After the socket 110 with a bolt hole 111 is mounted on the square drive 41 of the output shaft 5, a stopper pin 115 is inserted through a connection hole 113 of the socket 110 and the through hole 45 of the square drive 41 to attach the socket 110 to the output shaft 5. The same measure is taken to keep the stopper pin 115 in place as with the stopper pin 103 of the bit 100.

According to the torque transmission control device of the present embodiment constructed as described above, a torque exceeding a predetermined value causes slippage between the friction discs 65 and the input discs 63, and the friction discs 65 and the output discs 67. Therefore, bolts are not excessively torqued. Accordingly plastic deformation and breaks due to excessive bolt tightening are avoided.

Furthermore, a maximum torque value, which determines the joint strength of bolts, is adjustable in units of at least 45°. Different units are possible by changing the numbers of the stopper protrusions 21 and the corresponding stopper recesses 81.

The cap 83 does not allow a rotational impact load applied by the bit 100 of an impact wrench to the housing 2 to change the screw-in position of the friction adjustment screw 71. Therefore, unless the screw-in position of the friction adjustment screw 71 is readjusted by the operator after removing the cap 83, a predetermined maximum torque value is not subject to change during bolt tightening operations.

Because the input bush 3 made of hard tool steel is fitted in the housing 2 made of a light aluminum alloy having high heat radiation efficiency, the embodiment is light and strong. Moreover, the housing 2 significantly reduces over heating, which is an inherent problem of a friction clutch. Specifically, the temperature of a stainless steel housing 2 reached approximately 85° C. while that of the aluminum alloy housing 2 of the embodiment rose only to approximately 65° C. during bolt tightening operations. The operator handling the embodiment with cotton gloves does not feel the housing temperature of 65° C. too hot for a continuous use.

While the described embodiment represents the preferred form of the present invention, it should be understood that changes and variations may be made without departing from the spirit and the scope of the invention.

For instance, the housing 2 may be made of stainless steel because such a housing 2 still prevents change in the upper torque limit during bolt tightening.

The protrusion 75 formed on the friction adjustment screw 71 does not necessarily have to be a square drive as in the embodiment; a triangular, hexagonal, ellipse or other shape will be sufficient except for a body of rotation formed by rotating a given plane about the axis of the housing 2. Such a body of rotation as the protrusion 75 can not prevent rotation of the cap 83 with respect to the housing 2.

It will be appreciated that the protrusions 21 of the housing 2 and the protrusions defined by the recesses 81 of the cap 83 together form a dogclutch having a plurality of engagement positions about the axis of the drive.

What is claimed is:

1. A torque transmission device comprising coaxial rotatable input and output members interconnected by a torque transmitting clutch resiliently biased into engagement to transmit torque from the input to the output member, means for adjusting the resilient bias of the clutch to limit maximum torque transmission by the clutch to an adjustable desired maximum value and releasable retaining means for retaining a desired maximum torque transmission limit during the transmission of torque from the input to the output member;
a housing having a first end and a second end, the first end defining a cylindrical cavity with the output member therein and means at the second end for connection to a rotary power source;
wherein the means for adjusting the resilient bias of the clutch to limit maximum torque transmission to a desired maximum value is a pressure adjusting member located in the opening of the housing;
the pressure adjusting member has a bore which accommodates the output member; and
the pressure adjusting member has an axial projection extending outwardly from the housing with the bore extending therethrough.

2. A device according to claim 1 wherein the clutch comprises at least one friction disc interposed between a plurality of input and output discs, wherein each disc has a central bore and is positioned coaxially with the output member within the cavity.

3. A device according to claim 2 further comprising belleville springs axially positioned along the output shaft so as to sandwich the plurality of discs between them.

4. A device according to claim 3 wherein the pressure adjusting member is adjustably located in the opening of the housing so as to create a desired resilient deformation in the belleville springs to urge the discs toward each other.

5. A device according to claim 4 wherein the pressure adjusting member has an external screw thread which engages a corresponding thread in the housing to provide said adjustment.

6. A device according to claim 1 in which the housing has plurality of heat dissipating ribs disposed about its periphery.

7. A device according to claim 1 in which the housing has a plurality of heat dissipating holes.

8. A device according to claim 1 wherein the housing is made from aluminum.

9. A torque transmission device comprising:
coaxial rotatable input and output members interconnected by a torque transmitting clutch resiliently biased into engagement to transmit torque from said input to said output member;

a housing having a first end and a second end, said first end defining a cylindrical cavity with said output member therein and means at said second end for connection to a rotary power source;

a pressure adjusting member, located in the opening of said housing, for adjusting the resilient bias of the clutch to limit maximum torque transmission by said clutch to an adjustable desired maximum value, said clutch comprising at least one friction disc interposed between a plurality of input and output discs, and each disc having a central bore and being positioned coaxially with said output member within the cavity, and belleville springs being axially positioned along said output shaft so as to sandwich said plurality of dics between then;

releasable retaining means for retaining a desired maximum torque transmission limit during the transmission of torque from said input to said output member;

said pressure adjusting member having an external screw thread which engages a corresponding thread in said housing to provide said adjustment; and said pressure adjusting member further having a bore, which accommodates said output member, and an axial projection extending outwardly from said housing with said bore extending therethrough.

10. A device according to claim 9 wherein said releasable retaining means comprises a cap having a central opening which releasably engages said axial projection of said pressure adjusting member and said housing to prevent relative rotation of said pressure adjusting member and said housing.

11. A device according to claim 10 wherein said cap engages said housing by means of a dogclutch to prevent said cap from rotating relative to said housing and said axial projection and the opening of said cap are shaped to prevent said pressure adjuster member from changing position relative to said housing.

12. A device according to claim 11 in which said dogclutch defines a plurality of engagement positions for each rotation of said pressure adjuster member.

13. A device accordingly to claim 12 wherein said cap is releasably retained to said housing by means of an O-ring engaging an annular groove in the outer surfaces of engaging members of said dogclutch.

* * * * *